US010222232B2

(12) United States Patent
Alexander

(10) Patent No.: US 10,222,232 B2
(45) Date of Patent: Mar. 5, 2019

(54) SYSTEM AND METHOD FOR SUPPORT OF ONE-WAY ENDPOINTS IN TWO-WAY WIRELESS NETWORKS

(71) Applicant: Eaton Intelligent Power Limited, Dublin (IE)

(72) Inventor: Roger K. Alexander, Rockville, MD (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/590,140

(22) Filed: May 9, 2017

(65) Prior Publication Data
US 2017/0363443 A1    Dec. 21, 2017

Related U.S. Application Data

(63) Continuation of application No. 14/043,440, filed on Oct. 1, 2013, now Pat. No. 9,644,991.
(Continued)

(51) Int. Cl.
*G01D 4/00* (2006.01)
*H04W 84/18* (2009.01)

(52) U.S. Cl.
CPC ............ *G01D 4/002* (2013.01); *H04W 84/18* (2013.01); *Y02B 90/241* (2013.01); *Y04S 20/32* (2013.01)

(58) Field of Classification Search
None
See application file for complete search history.

(56) References Cited

U.S. PATENT DOCUMENTS 3,344,420 A     9/1967  Arsove
4,940,976 A  *  7/1990  Gastouniotis .......... G01D 4/004
                                                       136/205
(Continued)

FOREIGN PATENT DOCUMENTS

CA    2644635 A1    8/2008
CA    2812037 A1    3/2012
(Continued)

OTHER PUBLICATIONS

AME Data Concentrator Unit, Smart Metering Load Management Data Unit, Unique Mbane SA, 3 pages.
(Continued)

*Primary Examiner* — Curtis J King
(74) *Attorney, Agent, or Firm* — Patterson Thuente Pedersen, P.A.

(57) ABSTRACT

A sensor data collection system includes a plurality of sensors operatively coupled to a corresponding set of endpoints, the endpoints configured to communicate sensor data to a central data collection point via a data communication protocol. A proxy service-enabled endpoint facilitates interoperability with the data collection system for the benefit of endpoints that are otherwise incompatible with the data communication protocol. The endpoint includes a remote endpoint interface module configured to receive communications from at least one of the incompatible endpoints containing incompatible endpoint sensor data. A remote endpoint virtualization module operatively coupled to the remote endpoint interface module and associated with the at least one of the incompatible endpoints. The remote endpoint virtualization module is uniquely addressable according to a corresponding virtual endpoint address, and configured to store the incompatible endpoint sensor data and to communicate that data to the central data collection point via the data communication protocol.

16 Claims, 10 Drawing Sheets

Related U.S. Application Data

(60) Provisional application No. 61/708,511, filed on Oct. 1, 2012.

(56) References Cited

U.S. PATENT DOCUMENTS

| | | | |
|---|---|---|---|
| 5,600,558 A | 2/1997 | Mearek et al. | |
| 5,661,750 A | 8/1997 | Fulton | |
| 5,719,564 A * | 2/1998 | Sears | G08C 17/02 340/10.41 |
| 5,923,269 A * | 7/1999 | Shuey | G01D 4/004 340/870.02 |
| 6,038,652 A | 3/2000 | Phillips et al. | |
| 6,223,053 B1 | 4/2001 | Friedmann et al. | |
| 6,295,461 B1 | 9/2001 | Palmer et al. | |
| 6,393,341 B1 * | 5/2002 | Lawrence | G06F 9/54 340/870.02 |
| 6,542,536 B1 | 4/2003 | Hershey et al. | |
| 6,701,195 B2 | 3/2004 | Brown et al. | |
| 6,748,303 B2 | 6/2004 | Hawthorne | |
| 6,865,216 B1 | 3/2005 | Beamish et al. | |
| 7,020,701 B1 * | 3/2006 | Gelvin | G01D 21/00 250/332 |
| 7,187,906 B2 | 3/2007 | Mason, Jr. et al. | |
| 7,239,250 B2 | 7/2007 | Brian et al. | |
| 7,272,132 B2 | 9/2007 | Kim et al. | |
| 7,301,476 B2 | 11/2007 | Shuey et al. | |
| 7,328,037 B2 | 2/2008 | Tsien et al. | |
| 7,417,577 B2 | 8/2008 | Testud et al. | |
| 7,611,092 B2 | 11/2009 | Silansky et al. | |
| 7,734,380 B2 | 6/2010 | Ransom et al. | |
| 7,902,995 B2 | 3/2011 | Kim | |
| 7,987,260 B2 | 7/2011 | Rogers et al. | |
| 8,018,912 B2 | 9/2011 | Habetha | |
| 8,026,830 B2 | 9/2011 | Womble et al. | |
| 8,089,939 B1 | 1/2012 | Mater et al. | |
| 8,208,973 B2 | 6/2012 | Mehta | |
| 8,223,783 B2 | 7/2012 | Shorty et al. | |
| 8,355,866 B2 | 1/2013 | Smith et al. | |
| 8,378,848 B2 * | 2/2013 | Young | G01D 4/002 340/870.02 |
| 8,385,244 B2 | 2/2013 | Hole | |
| 8,548,607 B1 * | 10/2013 | Belz | G05B 15/02 700/21 |
| 9,356,831 B2 * | 5/2016 | Nelson | H04L 41/0803 |
| 9,644,991 B2 | 5/2017 | Alexander | |
| 9,699,708 B2 | 7/2017 | Alexander et al. | |
| 2003/0048199 A1 * | 3/2003 | Zigdon | H04B 1/707 340/870.02 |
| 2003/0067889 A1 * | 4/2003 | Petite | G01V 1/364 370/310 |
| 2003/0079211 A1 | 4/2003 | Lueh | |
| 2003/0120826 A1 | 6/2003 | Shay | |
| 2004/0028060 A1 | 2/2004 | Kang | |
| 2004/0078657 A1 | 4/2004 | Gross et al. | |
| 2005/0111377 A1 | 5/2005 | Lioy et al. | |
| 2005/0162283 A1 | 7/2005 | Salazar Cardozo | |
| 2005/0179561 A1 * | 8/2005 | Osterloh | G01D 4/004 340/870.02 |
| 2005/0190066 A1 * | 9/2005 | Schleich | G01M 3/2807 340/605 |
| 2005/0248456 A1 | 11/2005 | Britton, Jr. et al. | |
| 2006/0056368 A1 | 3/2006 | Ratiu et al. | |
| 2006/0129484 A1 | 6/2006 | Hurwitz et al. | |
| 2006/0217115 A1 | 9/2006 | Cassett et al. | |
| 2006/0248092 A1 | 11/2006 | Keller et al. | |
| 2006/0281435 A1 * | 12/2006 | Shearer | G06K 19/0707 455/343.1 |
| 2007/0010248 A1 | 1/2007 | Dravida et al. | |
| 2007/0057812 A1 * | 3/2007 | Cornwall | H04Q 9/00 340/870.02 |
| 2007/0105558 A1 | 5/2007 | Suh et al. | |
| 2007/0115922 A1 | 5/2007 | Schneider et al. | |
| 2008/0068215 A1 | 3/2008 | Stuber et al. | |
| 2008/0071501 A1 | 3/2008 | Herzog | |
| 2008/0151826 A1 | 6/2008 | Shorty et al. | |
| 2008/0158007 A1 | 7/2008 | Nagy et al. | |
| 2008/0180275 A1 | 7/2008 | Whitaker et al. | |
| 2008/0219210 A1 | 9/2008 | Shuey et al. | |
| 2008/0243439 A1 | 10/2008 | Runkle et al. | |
| 2008/0250301 A1 | 10/2008 | Mukhopadhyay et al. | |
| 2008/0295096 A1 | 11/2008 | Beaty et al. | |
| 2009/0058639 A1 | 3/2009 | Tanaka et al. | |
| 2009/0102680 A1 * | 4/2009 | Roos | G01D 4/008 340/870.02 |
| 2009/0109056 A1 | 4/2009 | Tamarkin et al. | |
| 2009/0135018 A1 | 5/2009 | Veillette et al. | |
| 2009/0135753 A1 | 5/2009 | Veillette | |
| 2009/0135836 A1 | 5/2009 | Veillette | |
| 2009/0135843 A1 | 5/2009 | Veillette | |
| 2009/0138617 A1 | 5/2009 | Veillette | |
| 2009/0138713 A1 | 5/2009 | Veillette | |
| 2009/0167558 A1 | 7/2009 | Borleske et al. | |
| 2009/0312006 A1 | 12/2009 | Montes et al. | |
| 2010/0007521 A1 | 1/2010 | Cornwall | |
| 2010/0131445 A1 | 5/2010 | Wu et al. | |
| 2010/0152910 A1 | 6/2010 | Taft | |
| 2010/0176967 A1 | 7/2010 | Cumeralto et al. | |
| 2010/0180694 A1 | 7/2010 | Ely, III | |
| 2010/0207784 A1 | 8/2010 | Bragg et al. | |
| 2010/0316043 A1 | 12/2010 | Doi et al. | |
| 2010/0317374 A1 | 12/2010 | Alpert et al. | |
| 2011/0009111 A1 | 1/2011 | Jung et al. | |
| 2011/0066297 A1 | 3/2011 | Saberi et al. | |
| 2011/0082596 A1 | 4/2011 | Meagher et al. | |
| 2011/0109479 A1 | 5/2011 | Teffer et al. | |
| 2011/0111700 A1 | 5/2011 | Hackett | |
| 2011/0131342 A1 | 6/2011 | Pace et al. | |
| 2011/0188516 A1 * | 8/2011 | Borleske | H04J 3/24 370/474 |
| 2011/0231320 A1 | 9/2011 | Irving | |
| 2011/0251933 A1 | 10/2011 | Egnor et al. | |
| 2011/0255548 A1 | 10/2011 | Johnson | |
| 2012/0019395 A1 * | 1/2012 | Willig | H04Q 9/00 340/870.02 |
| 2012/0029710 A1 | 2/2012 | Dodderi et al. | |
| 2012/0275361 A1 | 11/2012 | Berenberg et al. | |
| 2013/0009787 A1 * | 1/2013 | Ree | G01D 4/002 340/870.02 |
| 2013/0083722 A1 | 4/2013 | Bhargava et al. | |
| 2013/0181847 A1 * | 7/2013 | Willig | H04Q 9/00 340/870.03 |
| 2014/0019397 A1 | 1/2014 | Alexander | |
| 2014/0097966 A1 | 4/2014 | Alexander | |
| 2014/0269300 A1 | 9/2014 | Bennis | |
| 2014/0269388 A1 | 9/2014 | Kuru | |
| 2015/0208320 A1 | 7/2015 | Alexander et al. | |
| 2017/0367029 A1 | 12/2017 | Alexander et al. | |

FOREIGN PATENT DOCUMENTS

| | | |
|---|---|---|
| CA | 2574065 C | 3/2013 |
| CA | 2626790 C | 5/2013 |
| EP | 1367846 A1 | 12/2003 |
| EP | 1261142 B1 | 7/2008 |
| EP | 2375576 A1 | 10/2011 |
| EP | 2381586 A1 | 10/2011 |
| EP | 1736010 B1 | 9/2013 |
| WO | WO 2001/022662 A1 | 3/2001 |
| WO | WO 2012/036633 A1 | 3/2012 |
| WO | WO 2012/176951 A1 | 12/2012 |
| WO | WO 2013/028629 A2 | 2/2013 |

OTHER PUBLICATIONS

Wikipedia, "Electric Power System," dated May 8, 2012, 7 pages.
Sheu et al., "A Clock Synchronization Algorithm for Multihop Wireless Ad Hoc Networks," Wireless Personal Communications, (2007), 43:185-200, 16 pages.
Ahmad et al., "A Survey of Low Duty Cycle MAC Protocols in Wireless Sensor Networks," Emerging Communications for Wireless Sensor Networks, Feb. 2011, 23 pages.

(56) References Cited

OTHER PUBLICATIONS

Semtech Wireless & Sensing Datasheet, SC1272/73—860 MHz to 1020 MHz Low Power Long Range Transceiver, Semtech Corporation, Jun. 2013, 127 pages.
Suwansantisuk et al., "Frame Synchronization for Variable-Length Packets," IEEE Journal on Selected Areas in Communications, vol. 26, No. 1, Jan. 2008, 18 pages.
De Couto et al., "A High-Throughput Path Metric for Multi-Hop Wireless Routing," Wireless Networks 11.4 (2005), 13 pages.
PCT/US2015/011902, filed Jan. 19, 2015, Search Report and Written Opinion dated Apr. 13, 2015, 7 pages.
PCT/US2013/048451, filed Jun. 28, 2013, Search Report and Written Opinion, dated Oct. 16, 2013, 9 pages.
PCT/US2013/062819, filed Oct. 1, 2013, Search Report and Written Opinion, dated Jan. 29, 2014, 13 pages.
EP Application No. 13817452.9, extended European Search Report dated Feb. 22, 2016, and supplemental European Search Report dated Mar. 10, 2016, 6 pages.
Application and File History for U.S. Appl. No. 13/547,420, filed Jul. 12, 2012. Inventor: Alexander.
Application and File History for U.S. Appl. No. 14/043,440, filed Oct. 1, 2013. Inventor: Alexander.
Application and File History for U.S. Appl. No. 15/633,919, filed Jun. 27, 2017. Inventor: Alexander et al.
Application and File History for U.S. Appl. No. 14/158,043, filed Jan. 17, 2014. Inventor: Alexander et al.

\* cited by examiner

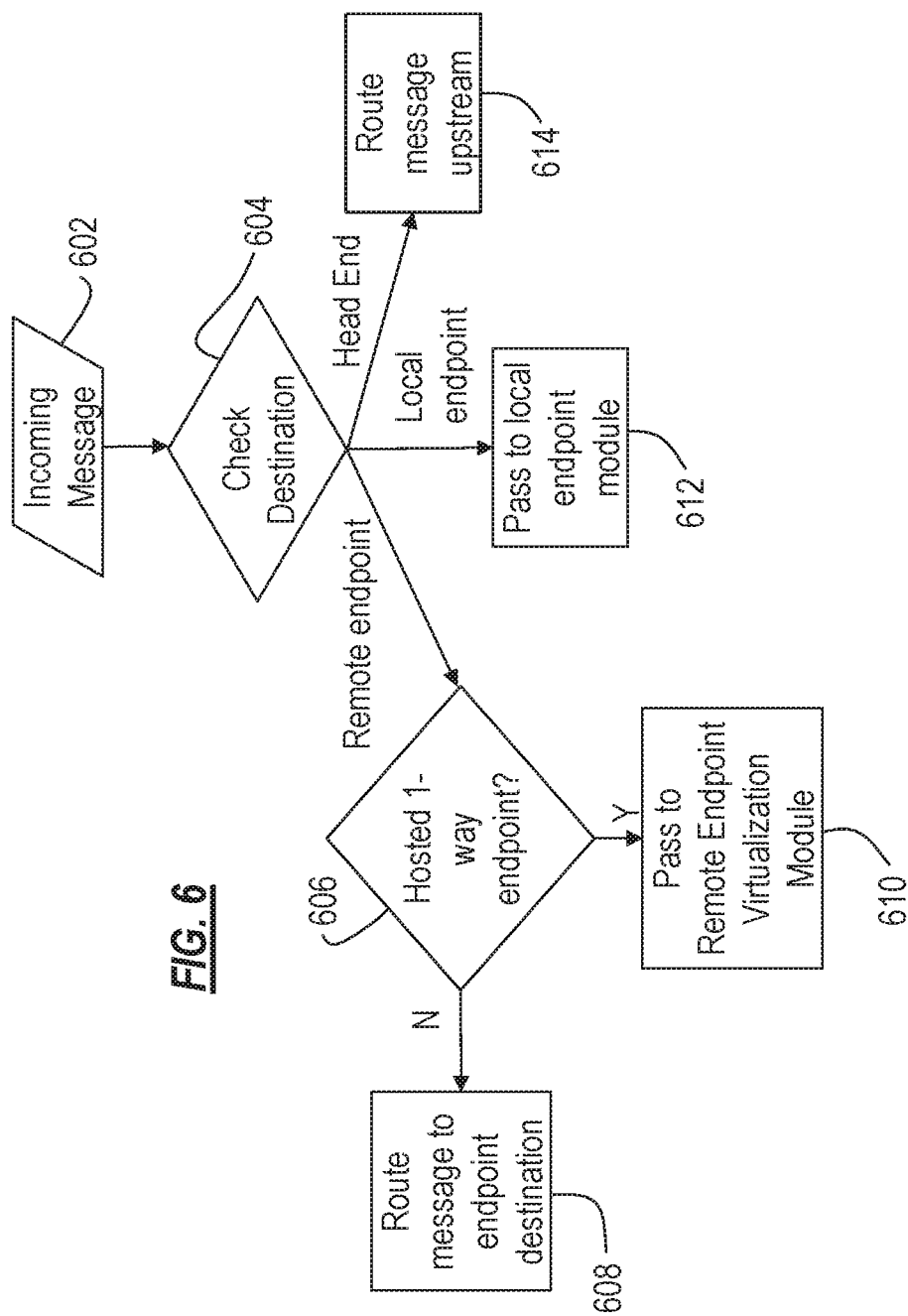

SYSTEM AND METHOD FOR SUPPORT OF ONE-WAY ENDPOINTS IN TWO-WAY WIRELESS NETWORKS

RELATED APPLICATION

This application is a continuation of U.S. application Ser. No. 14/043,440 filed Oct. 1, 2013, now U.S. Pat. No. 9,644,991, which claims the benefit of U.S. Provisional Application No. 61/708,511 filed Oct. 1, 2012, which is hereby fully incorporated herein by reference.

FIELD OF THE INVENTION

The invention relates generally to automated sensor data collection systems, such as utility meter reading systems or other systems in which data is collected from a large plurality of geographically distributed endpoints to a central collection point and, more particularly, to facilitating the deployment and operation of transmit-only endpoints in systems that preferentially utilize command and control functionality for advanced two-way endpoints.

BACKGROUND OF THE INVENTION

Automatic meter reading ("AMR") is the technology of automatically collecting consumption, diagnostic, and status data from utility meters (e.g., water or energy metering devices such as gas or electric) and transferring that data to a central database at the system head end for billing, analyzing usage, and controlling the utility infrastructure. AMR and the Advanced Metering Infrastructure (AMI) that facilitates the associated utility systems communications and control are thus a particular example of the broader category of automated sensor data collection systems in which distributed monitors and sensors provide information that can be centrally collected and processed and used as a basis for implementing centralized or distributed system controls.

AMR technologies, as a representative of the greater class of automated sensor collection systems, have included hand-held, mobile and fixed network technologies based on telephony platforms (wired and wireless), dedicated radio frequency (RF) collection systems, or powerline transmission. See generally http://en.wikipedia.org/w/index.php?title=Automatic_meter_reading&oldid=49046539. Of these approaches, RF data collection systems utilizing using licensed or un-licensed bands in the RF spectrum remains widely used for its effectiveness, ease of installation, reliability, relatively low cost, and independence from third-party networks.

Originally, this technology was developed to save utility providers the expense of periodic trips to each physical location to read a meter. Early systems used handheld reading devices that had to be hand-carried into the vicinity of each meter to conduct reads, thereby avoiding having to enter into the homes of customers. Subsequent technologies utilized vehicle-mounted readers that had the ability to drive through neighborhoods at posted speed limits while gathering data from meters, and eventually fixed networks in which reader devices are permanently installed to create a cellular-like AMR network able to read utility meters at greater frequency and provide commands and configuration updates to the utility meters in real time or near real time.

The utility meters in an AMR system are either interfaced with, or incorporate, an endpoint that obtains the meter's data, stores the data temporarily, and transmits the data to a reader. The simplest endpoints are transmit-only devices known as 1-way endpoints. These endpoints operate in a "bubble-up" regime in which their transmitters periodically wake up from a low-power sleep mode, transmit stored data, and return to their sleep mode. Typical bubble-up cycles are on the order of 15 seconds for AMR systems using vehicle-mounted readers, which is a time sufficiently short for each endpoint to remain within communication range of a moving reader. For hand-carried readers and fixed systems, the bubble-up cycle can be quite different.

Regardless as to the variation in bubble-up cycles, conventional fixed AMR systems that deploy 1-way endpoints must have the ability to handle massively duplicated data being transmitted repeatedly by numerous devices. Typically, duplicated data from repeated transmissions by 1-way devices are collected by the AMR system fixed receivers in which reconciliation of the duplicate data has been handled centrally at the system head end. Given the limited amount of data sent by each 1-way endpoint's transmissions, collection of the duplicated data and centralized reconciliation thereof, has been feasible.

Another type of transmit-only endpoint is known as a one-and-one-half-way (1.5-way) endpoint. The 1.5-way endpoint has a basic radio receiver circuit that is able to detect a specific signal called a wake-up tone. As its name implies, wake-up tones can be analog signals having a particular modulating tone; but can also be digital signals having a repeating pattern or predefined code. Instead of bubbling up and transmitting its data according to a recurring time schedule like a basic one-way device, the 1.5-way endpoint periodically activates its receiver momentarily to listen for a presence of a wake-up tone. If the wake-up tone is detected, the 1.5-way endpoint activates its transmitter circuit and sends its data. This mode of operation reduces collection system bandwidth requirements and saves energy in battery-powered endpoints because endpoints transmit only when a reader is within communication range.

The use of several distinct wake-up tones has been proposed for use as a limited set of predefined commands to 1.5-way devices. For instance one wake-up tone can be used to request the transmission of interval data, whereas another wakeup tone can be used to request transmission of a single reading. In some cases the wake-up signal may be addressed to an individual endpoint or to the endpoint's assigned group address. Still, 1.5-way endpoints lack the capability to initiate communications, and respond to, a complex instruction set (such as one that includes opcodes and variable operands, or re-configuration instructions). Thus, 1.5-way devices are regarded as primarily transmit-only endpoints.

More advanced endpoints known as two-way devices have a radio receiver in addition to a transmitter. The receiver allows the two-way endpoint to initiate communications connections as well as receive commands via the AMR system. This, in turn, enables AMR system operators to individually address specific two-way endpoints to request certain data, re-configure the two-way endpoint's operating modes, receive software or firmware updates, and the like. Two-way endpoints can also be used to send more advanced data, such as interval data for multiple sampling intervals, which requires longer message transmissions, or messages spanning multiple different transmissions. Since two-way communications allow the reader to request messages from endpoints, meter data as well as status information can be queried and provided in near-real-time. Also, the request for data can specify the particular data to be sent by the two-way endpoint, e.g., interval data at 15-minute intervals over the last 36 hours. This avoids having to collect this data over multiple separate transmissions (which places additional overhead requirements on the AMR system's bandwidth), storing large sets of duplicate or overlapping data for each endpoint for future data analysis needs, and having to deal with duplication-reconciliation of repeated messages.

Presently, AMR system operators are migrating their systems toward more advanced AMI systems using a fixed AMR infrastructure and self-organizing, autonomously-adapting two-way endpoints. Such systems use multi-hop communications in which endpoints act as originators of data, as well as routing devices that relay messages originated by other endpoints towards their destination. In these AMI systems, there is no pre-configuration of associations between endpoints; thus, devices must coordinate amongst themselves to form communication paths for the messages.

Even with the deployment of AMI systems, there are still millions of one-way devices currently deployed that cannot be practically replaced all at once. Moreover, in some environments and for some applications, cost pressures may encourage AMR system operators to deploy new one-way devices in lieu of more advanced and consequently more expensive two-way endpoint technologies. Simple sensor monitoring applications can also be added to utilize the transport infrastructure of the overlay 2-way AMI systems already deployed. This leaves AMR system operators with mixed systems in which one-way devices and two-way devices are operating in the same system, with each type of endpoint requiring a different reading process for collecting its data.

Moreover, given that 1-way devices may exist anywhere within the coverage footprint of a 2-way network, additional difficulties arise in such 2-way multi-hop networks where endpoints that are to act as relays for forwarding messages from one-way devices need to be specifically configured via a human-driven process, to support such operations. A practical solution is therefore needed to simplify and automate AMR system operations in mixed systems.

SUMMARY OF THE INVENTION

One aspect of the invention is directed to a sensor data collection system that includes a plurality of sensors operatively coupled to a corresponding set of endpoints, the endpoints being configured to communicate sensor data to a central data collection point via a data communication protocol. According to certain embodiments, a proxy service-enabled endpoint facilitates interoperability with the data collection system for the benefit of endpoints that are otherwise incompatible with the data communication protocol. The proxy service-enabled endpoint includes a remote endpoint interface module configured to receive communications from at least one of the incompatible endpoints, the communications containing incompatible endpoint sensor data. Additionally, the endpoint includes a remote endpoint virtualization module that is operatively coupled to the remote endpoint interface module and associated with the at least one of the incompatible endpoints. The remote endpoint virtualization module is uniquely addressable according to a corresponding virtual endpoint address, and configured to store the incompatible endpoint sensor data and to communicate that data to the central data collection point via the data communication protocol.

Another aspect of the invention is directed to a method for operating an automatic meter reading (AMR) system containing 2-way endpoints, 1.5-way endpoints, and 1-way endpoints. Data from individual endpoints is collected at a central data collection point via the AMR system using a 2-way wireless communications protocol. However, the 1-way endpoints are incompatible with the 2-way wireless communication protocol. According to this method, a plurality of 2-way endpoints monitor a communication band used by the 1-way endpoints to detect any 1-way endpoints within communication range of each one of the plurality of 2-way endpoints. Each of the plurality of 2-way endpoints reports any detected 1-way endpoints within its communication range. An arbiter device collects reports of detected 1-way endpoints from the plurality of 2-way endpoints, and sends proxy assignments to selected proxy-assignee endpoints. For each of the reported 1-way endpoints at least one proxy-assignee endpoint is assigned to perform a proxy service. According to the proxy service, data transmitted by corresponding 1-way endpoints to which the proxy-assignee endpoints are assigned is received and stored. At least a portion of the data transmitted by the corresponding 1-way endpoint is transmitted via the 2-way wireless communication protocol for reception by the central data collection point.

In another aspect of the invention, an endpoint proxy device for use with a two-way automatic sensor data collection system is provided. The endpoint includes endpoint hardware circuitry, including a processor circuit, a data store operatively coupled to the processor circuit, communications circuitry operatively coupled to the processor circuit and configured to transmit and receive data communications in a wireless network. The endpoint proxy device comprises a remote endpoint interface module implemented with the endpoint hardware circuitry and configured to wirelessly receive, via the hardware circuitry, 1-way transmissions originated from at least one remotely-located 1-way endpoint that is coupled to a corresponding at least one sensor. The 1-way transmissions are transmitted in a 1-way communications protocol representing sensor data from the at least one sensor.

A remote endpoint virtualization module is operatively coupled with the remote endpoint interface module, and configured to store, via the hardware circuitry, sensor data received in the 1-way transmissions for a first assigned 1-way endpoint; and transmit, via the hardware circuitry and the wireless network, a sensor data report based on the sensor data for the first assigned 1-way endpoint. The sensor data report is transmitted via a 2-way communications protocol.

BRIEF DESCRIPTION OF THE DRAWINGS

The invention may be more completely understood in consideration of the following detailed description of various embodiments of the invention in connection with the accompanying drawings, in which:

FIG. 6 is a flow diagram illustrating an example of decision logic for handling incoming messages received at a 2-way endpoint that is configured to also perform proxy operations for one or more supported 1-way endpoints according to one embodiment of the invention.

Figure 1A:
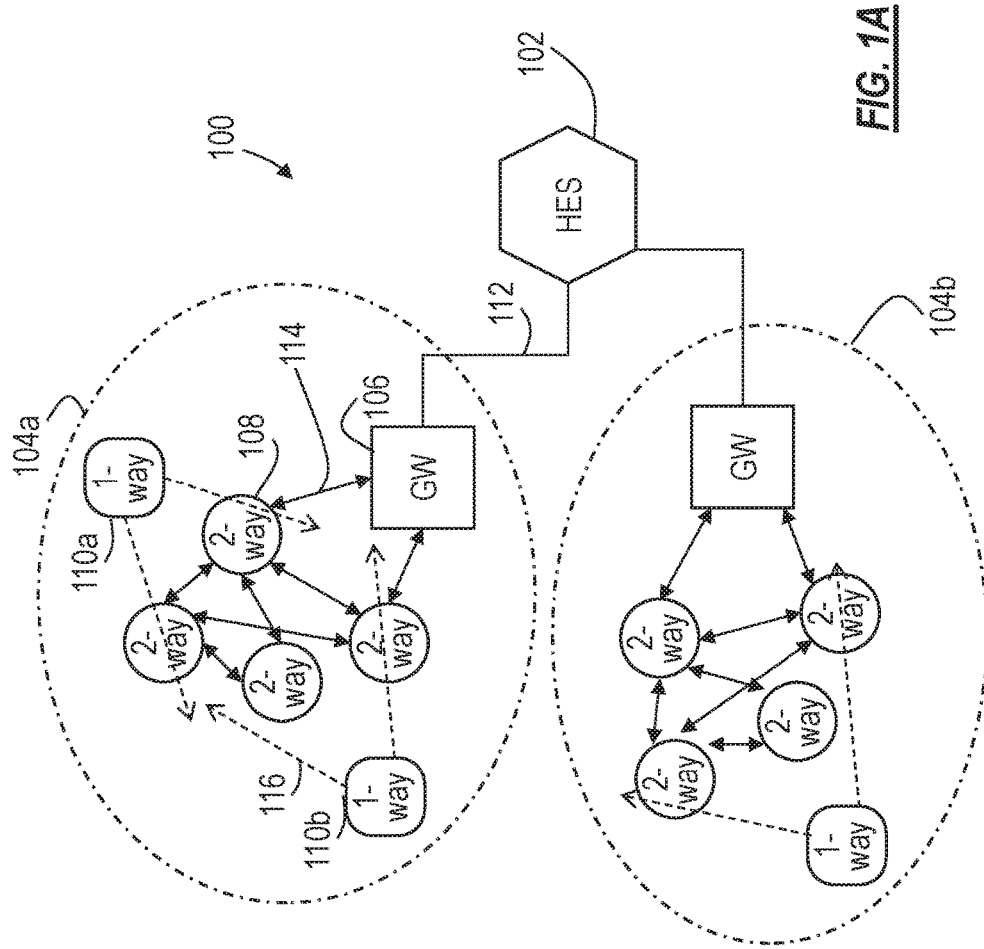
FIG. 1A is a schematic diagram illustrating an exemplary part of an AMR system according to one embodiment in which a combination of 1-way and 2-way endpoints are deployed.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the invention are directed to sensor data collection systems. A sensor data collection system in the present context refers to any system that includes a spatially distributed set of communication devices for transmitting sensor data originated by a large plurality of spatially distributed sensors. Each of the spatially-distributed sensors is associated with an endpoint that facilitates communication of information from the sensor. Oftentimes, the sensors themselves may be integrated with the endpoints as unitary multifunctional devices. Other times, endpoints are independent devices that, in operation, are suitably interfaced with their respective sensors to obtain sensor readings produced by the sensor devices. For the sake of brevity, both types of arrangements of endpoints are referred to herein as endpoint devices or, simply, endpoints.

In the following detailed description, example embodiments are described primarily in the context of automatic meter reading (AMR) systems in which the spatially-distributed sensors include utility meters such as electricity, water, gas, and the like, that are specifically adapted for measuring data relating to the distribution or consumption of a utility commodity. However, unless it is expressly limited in a particular claim, the present invention is applicable more generally to any sensor data collection system, such as, for instance, industrial process monitoring systems, environmental phenomenon monitoring systems, infrastructure monitoring systems, etc., where the various sensors regularly provide their measured data through the communication devices to a central data collection point in which 2-way endpoints are used along side 1-way endpoints and 1.5-way endpoints.

In the present context, the term 2-way endpoint refers to a communication device that communicates via a 2-way communications protocol in which bi-directional data communication includes the capability to receive and respond to various commands or instructions, such as instructions having variable operands, or re-configuration instructions, from a remote device according to a predefined instruction set and where those exchanges are not necessarily of a pre-determined nature. The term 1-way endpoint refers to a primarily transmit-only endpoint that either altogether lacks a receiver, has a receiver but is configured to not use its receiver in its ordinary course of operation, or has only limited use of its receiver and is not capable of receiving a variety of commands via the receiver from remote devices. The term 1.5-way endpoint refers to a primarily transmit-only device that has a receiver and, while able to listen for, and respond to, a simple prompting signal known as a wakeup tone (or a set of wakeup tones) that prompt the 1.5-way endpoint to take a certain action (from a relatively limited set of actions) such as transmitting its data, going into a low-power sleep mode, etc., and otherwise lacks the ability to receive command packets in a 2-way communication protocol and respond to instructions from those command packets such as instructions having variable operands, or re-configuration instructions. For the sake of brevity, the class of non-2-way devices (i.e., 1-way and 1.5-way endpoints) is referred to herein as simply 1-way endpoints, or transmit-only endpoints, unless a distinction between 1-way and 1.5-way devices is meant to be conveyed, in which case 1.5-way devices will be specifically called out.

The central data collection point is a point where a large plurality of endpoints send their data to be consumed. Consumption of collected data in this context refers to use of the data for any of a variety of purposes, including one or more of such activities as processing of the data for billing purposes, system status determination and analysis, system performance optimization, issuing control signals or commands in response to the received data, etc. In an AMR system, a central collection point is oftentimes referred to as a head end system (HES). In a given sensor data collection system, there may be one, or even more than one, central data collection point. The central data collection point need not actually be at the top of a hierarchy of nodes in the sensor data collection system. Principles of the invention can apply to even an intermediate device that collects and consumes data from a plurality of endpoints that comprise a subset of the data collection system.

FIG. 1A is a schematic diagram illustrating an exemplary part of an AMR system 100 according to one embodiment in which a combination of 1-way and 2-way endpoints are deployed. In this simplified example, system head end 102 communicates with segments, or subnets, of endpoints 104*a* and 104*b* (collectively referred to as subnets 104). Each subnet 104 contains a gateway device 106, a plurality of 2-way endpoints 108, and one or more types of 1-way devices depicted as 110*a* and 110*b*, and collectively referred to as 1-way endpoints 110. Each gateway device 106 communicates with the head end 102 via communication link 112, which can be a WAN interface, wired, or wireless. Gateway devices 106 interface the local communications within a subnet 104 to translate communications from the intra-subnet protocol to the protocol used for the WAN interface, and vice-versa.

Figure 2A:
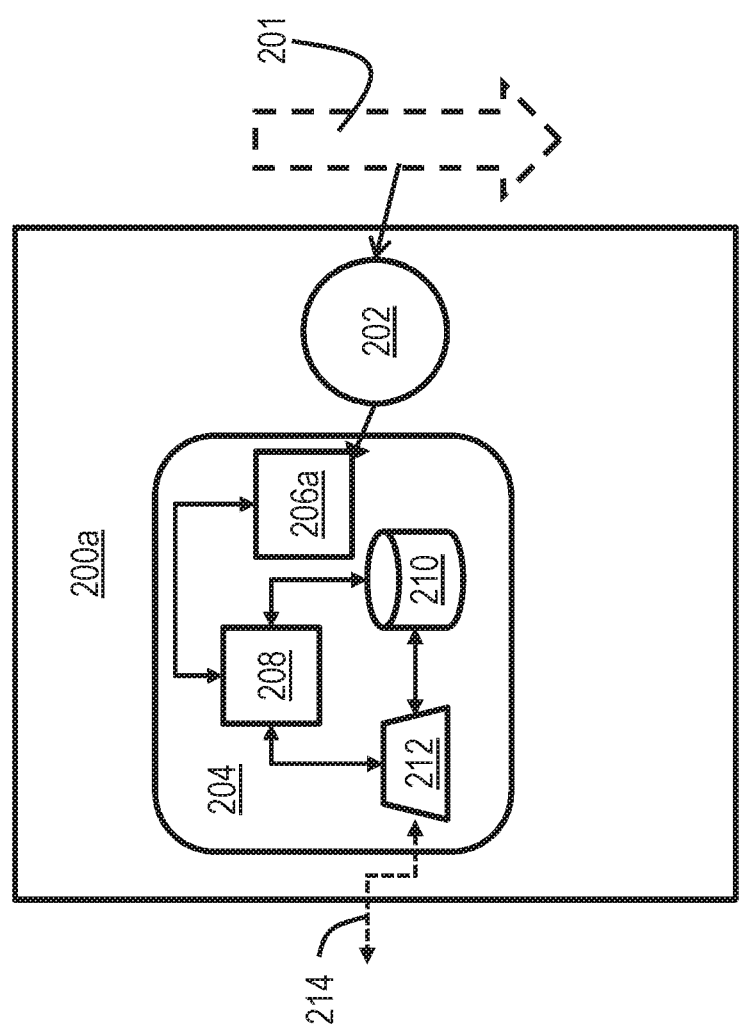
FIGS. 2A and 2B are a block diagrams illustrating exemplary endpoints according to various types of embodiments
Figure 2B:
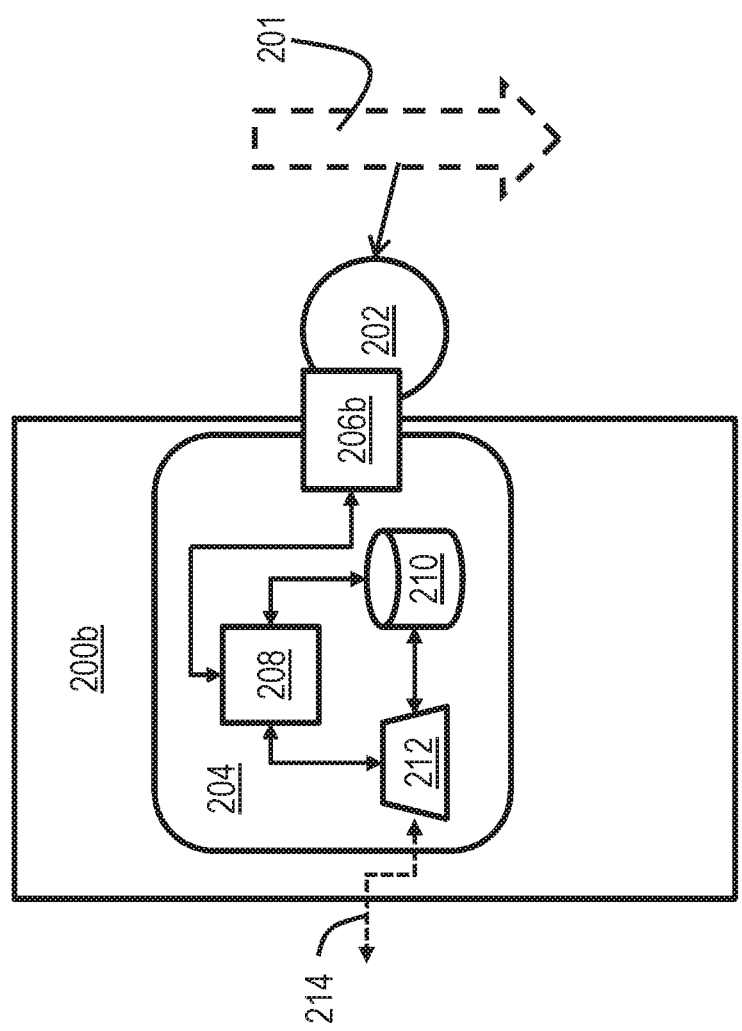

FIGS. 2A and 2B are block diagrams illustrating exemplary endpoints 200a and 200b according to various types of embodiments. Endpoint 200a is a compound endpoint (such as a smart meter, for example), that includes a sensor 202 that is configured to measure an event, state, natural phenomenon, etc., indicated at 201. In an AMR system event 201 represents energy or water utilization, for instance. Data from sensor 202 is provided to endpoint circuitry 204 via interface circuit 206a that interfaces with the sensor electrically.

Endpoint 200b is a peripheral device that is adapted to interface with a stand-alone sensor 202 via interface device 206b. Interface device 206b interfaces with sensor 202 electrically, mechanically, or optically, as appropriate. An electrical interface can include a digital communications interface such as a serial port, or an analog input with analog-to-digital conversion (ADC). An example of a mechanical interface is an encoder component, which may be magnetically coupled to the sensor; an example of an optical interface is a photosensor or digital imaging device for reading a rotating disc in a utility meter or for reading the gauges thereof.

Interfaces 206a and 206b obtain sensor data from sensor 202 via sampling of the sensor output. The sampling can take place in response to the occurrence of certain sensed events, or according to a pre-established interval schedule. Sensor data is passed to processor 208, which can store certain samples in data store 210. Processor 208 also controls the reporting of certain sensor data measurements and other information to the AMR system. Radio communications circuit 212 conducts communication over a wireless medium 214, including sending consumption readings, interval data reports, sensor status events, or the like, to be delivered to the system head end. In 2-way endpoints, radio communications circuit 212 includes a receiver that receives instructions, control signaling, or configuration information from the head end or from other devices such as gateway devices.

Referring back to FIG. 1A, within each subnet 104, the two-way endpoints 108 communicate bi-directionally with one another and with the gateway device 106 via local communications 114, which may be carried out over an unlicensed wireless RF band using a spread spectrum technique such as frequency-hopping spread spectrum (FHSS). Communications 114 include packetized communications to and from two-way endpoints. In some embodiments, two-way endpoints 108 utilize multi-hop communications in which the devices are capable of routing packets originated from other endpoints toward their destination. Accordingly, packets communicated in such systems can include an identifier of the addressee, i.e., the intended recipient node and, in some embodiments, routing information that can include complete path information. Communications protocols can, in some instances, include features for ensuring reliability of communications, such as the use of acknowledgement frames sent by receiving devices signifying successful receipt of preceding frame from a sender device.

Communications 116 include transmissions from 1-way devices. These transmissions are generally broadcast and not addressed to a particular destination because they are designed to be a point-to-point transmission to an AMR system reader within radio transmission range. It is presumed that either no other receiver is in the vicinity, that no other receiver is interested in the transmission, or that, if multiple AMR system readers receive transmissions from the same endpoint with the same information, that the head end can identify and reconcile the duplicative data. For 1.5-way devices, communications 116 can include wakeup tones. Since 1-way endpoints are not designed for duplex communications, there is no provision for ensuring reliability. Instead, 1-way endpoints transmit their data frequently to increase the probability that a each message is received.

According to one aspect of the invention, the 1-way devices 110 are read via a 2-way AMR system that treats the 1-way devices as if they were 2-way devices. In one example, the system head end 102 can request data from any specific device, regardless of whether that device is a true 2-way endpoint, or a 1-way endpoint. In another example, the system head end 102 can transmit configuration update instructions to endpoints to configure data intervals, reporting format, reporting frequency, etc., and, in response, the data that the head end 102 receives from each 1-way endpoint is updated according to the configuration update instructions. Although from the perspective of the head end 102 the 1-way endpoints 110 appear to operate as 2-way endpoints, the 1-way endpoints are not actually modified in any way. Instead, the 1-way endpoints are virtualized as 2-way devices with the help of actual 2-way endpoints located in their vicinity.

In one type of embodiment, 2-way endpoints 108 are configured to act as proxies for establishing virtual 2-way endpoints from actual 1-way endpoints 110. Accordingly, 2-way endpoints 108 include a facility for discovering 1-way devices 110 within communication range, receiving data transmitted by those 1-way endpoints 110, storing received data in association with the 1-way endpoints 110 from which that data was originated, and reporting to the system head end, in 2-way fashion, the received data (or reports having information based on the received data if the required report format differs from the format in which the 1-way endpoint data was received). The reporting of 1-way endpoint data in two-way fashion, in one embodiment, is performed in response to an interrogation command issued by the system head end 102 and addressed to the 1-way devices as if they were 2-way devices.

Figure 1B:
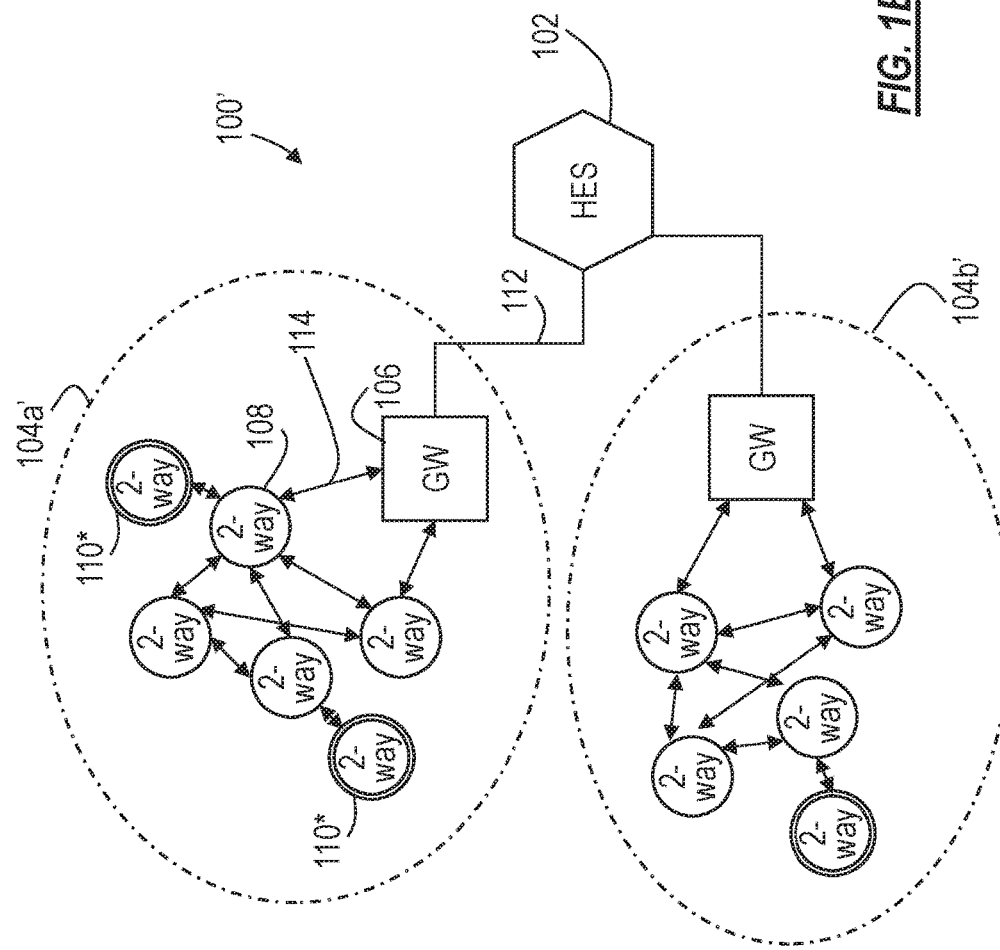
FIG. 1B illustrates a modified AMR system that is identical to AMR system of FIG. 1A, except that the 1-way endpoints are seen by head end as virtual 2-way endpoints which apparently have only 2-way devices, each of which is individually addressable.

FIG. 1B illustrates a modified AMR system 100' that is identical to AMR system 100 of FIG. 1A, except that the 1-way endpoints 110 are seen by head end 102 as virtual 2-way endpoints 110* in subnets 104a' and 104b' which apparently have only 2-way devices, each of which is individually addressable. For packet routing purposes, each of virtual 2-way devices 110* is recognized by the local mesh network as being reachable through the 2-way endpoint 108 that is assigned to be the proxy. When that proxy device receives a packet addressed to the virtual 2-way device 110*, instead of forwarding the packet in usual routing fashion, the proxy device instead performs its proxy operations.

As depicted in FIG. 1A, actual 1-way devices 110 have a limited communication range, and only certain ones of the 2-way devices 108 can hear certain 1-way devices 110. It is also possible for more than one 2-way endpoint to be able to hear the same 1-way endpoint's transmissions. Accordingly, in a related aspect of the invention, an arbitration process is provided in which a local portion of the AMR system 100, such as a subnet, can automatically select the best 2-way endpoint 108 from among multiple 2-way endpoints 108 which can be potential proxies for a given 1-way endpoint 110, to serve as the assigned proxy.

In one such embodiment, a distributed process of proxy-client arbitration is carried out with the help of local arbiter devices such as gateway devices 106. In one exemplary approach, gateway device 106 is passed performance measures of taken by 2-way endpoint devices 108 that are prospective proxy devices for 1-way endpoints. Performance measures can include a link quality metric such as radio signal strength or the quantity of correctly-received messages from a given 1-way endpoint over a certain period of time. The criteria for what constitutes a correctly-received message can be based on whether error detection/error correction codes, if any, indicate reception of an error-free message; whether a received message has a proper packet format; or, simply, whether there is a discernable message indicative of the 1-way endpoint that transmitted it.

In a related embodiment, the proxy-client arbitration process is dynamic in nature; meaning that changes in link quality can be autonomously responded to by re-arbitrating proxy assignments so that the best proxy device is preferentially selected under the current circumstances. In one such approach, prospective proxy devices that are not assigned to particular 1-way endpoints within communication range still operate in a discovery mode to listen for 1-way device transmissions, and collect relevant link quality data to be compared against similar link quality data gathered by other prospective (or assigned) proxy devices.

In a related embodiment, each prospective and assigned proxy device reports the 1-way endpoints and their respective link quality measures to a local master device, such as gateway 106. Gateway 106 thus obtains knowledge of all of the 1-way devices to be supported within the local neighborhood, or subnet, along with information on the prospective 2-way endpoints that could act as proxy devices for each of the various 1-way endpoints. With this information, gateway 106 determines the best proxy device for each of the 1-way endpoints, and instructs that device to handle the proxy operations. The proxy device assignment is continuously or periodically re-evaluated according to various embodiments to be able to respond dynamically to situational changes, if any, affecting the best proxy determination.

In another related embodiment, the operational burden of supporting proxy services for the benefit of multiple 1-way endpoints is taken into account in assigning the proxy responsibility to a given 2-way endpoint. This consideration can limit the number of 1-way endpoints that a particular 2-way endpoint can support with its proxy service, and this limitation can be done selectively taking further into account the link quality (and operational burden) of the next-best 2-way endpoint that is a prospective proxy device for one or more of the same 1-way endpoints.

In another related embodiment, the routing location of a potential proxy device is taken into account in arbitrating the proxy assignment. Thus, if among two otherwise equivalent potential proxy devices one requires fewer hops to reach the gateway device, the potential proxy with the shorter communication path (and thus lower communication latency) can be preferentially selected to be the assigned proxy. On the other hand, a potential proxy device having a superior routing position is also more likely to be performing routing activity for other 2-way devices, which tends to increase its operational burden, and cause that potential proxy device to be less preferable. To resolve situations where there are competing factors, a weighting and scoring decision algorithm may be employed in one type of embodiment where each of the factors is given a particular weight corresponding to that factor's relative importance, and a numerical assessment is performed to determine an optimal proxy assignment.

In still another related embodiment, the proxy assignment arbitration process deliberately introduces redundancy in cases where there is no high-quality link available with any potential proxy device, or where the available high-quality-link proxy device is too busy to handle proxy operations. In such cases, multiple proxies are assigned to a common 1-way endpoint. This arrangement will create duplication of data, so a reconciliation process is instituted. The reconciliation process can be administered by the proxy devices as amongst themselves; e.g., two proxies can exchange messages indicating reception of a data packet from the supported 1-way endpoint, and coordinate forwarding of the data to the system head end such that only one of the proxy devices sends the message. In another approach, the local gateway device identifies and removes duplicate data. In yet another approach, the duplication can be addressed by the system head end in a manner similar to the one employed in AMR systems designed for such redundancy.

The 1-way devices 110 can be of different types, i.e., from various different manufacturers, utilizing different message formats or protocols, data encoding, message transmission rate, etc., even though they may operate in the same RF band. Also, for 1.5-way endpoints in particular, different types of endpoints may be configured to respond to different wakeup tones. To address these challenges, in a related embodiment, 2-way endpoints 108 that are configured to act as 2-way proxies for 1-way endpoints 110 also include universal interfacing functionality in which various known messaging formats can be recognized so that the 1-way endpoint data contained in those messages can be extracted. Similarly, in another related embodiment, 2-way endpoints that act as proxy devices include support for different types of 1.5-way endpoints in that multiple different wakeup tones can be used to prompt various known types of 1.5-way endpoints.

Figure 3:
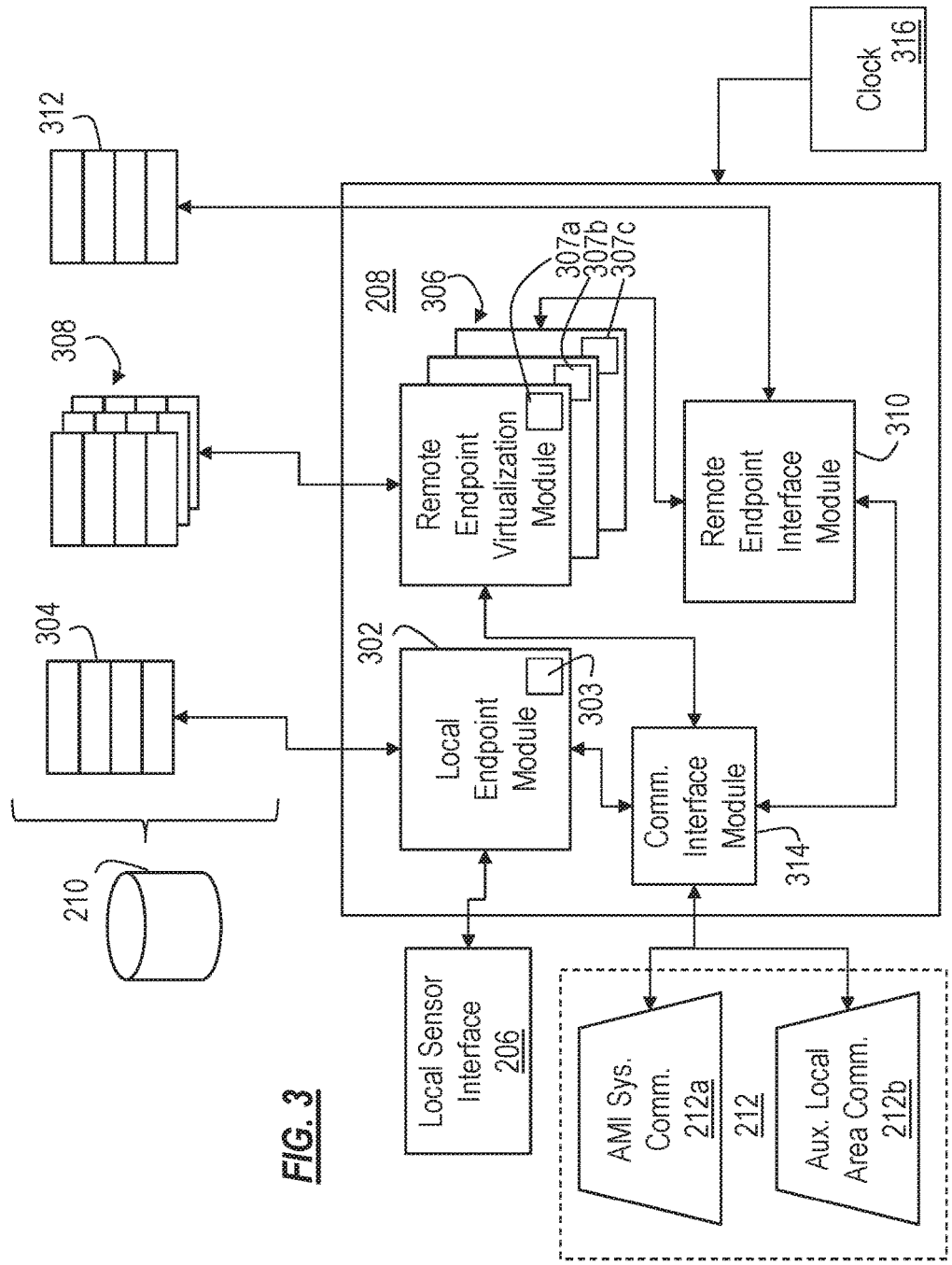
FIG. 3 is a block diagram illustrating an exemplary architecture of a 2-way endpoint that includes proxy service capability for virtualizing 2-way operability of 1-way endpoints according to certain embodiments of the invention.

FIG. 3 is a block diagram illustrating an exemplary architecture of a 2-way endpoint that includes proxy service capability for virtualizing 2-way operability of 1-way endpoints according to certain embodiments of the invention. This exemplary architecture includes several operational modules. The term "module" as used herein means a real-world arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more general purpose computers (such as the one described in greater detail below) that execute an operating system, system programs, and application programs, while also implementing the module using multitasking, multithreading, distributed (e.g., cloud) processing, or other such techniques. Accordingly, each module can be realized in a variety of suitable configurations, and should not be limited to any particular implementation exemplified herein.

In one particular example, as depicted, processor 208 is a microprocessor, microcontroller, digital signal processor, application-specific integrated circuit, or other such circuit, configured by program logic to implement local endpoint module 302, remote endpoint virtualization module 306, remote endpoint interface module 310, and communication interface module 314. These modules do not necessarily constitute the entire functionality of processor 208. Indeed, processor 208, in various embodiments, will include a set of other modules, such as networking functionality, power management, tamper detection, and the like. The modules illustrated in FIG. 3 instead represent the essential and additional relevant functionality and algorithmic structures for instituting the advanced 2-way endpoint plus proxy device operability according to one type of embodiment. Local endpoint module 302 is interfaced with local sensor interface 206, which obtains the sensor data (e.g., utility consumption readings) and converts it to a digital form to be handled by local endpoint module 302.

Local endpoint module 302 is assigned an address or endpoint ID 303 for the local 2-way endpoint, and stores the sensor data as local endpoint data set 304 associated with the address or device ID in data store 210. Local endpoint module 302 also receives and processes commands and system configuration updates from hierarchically superior devices of the AMR system (such as the system head end and gateway devices, for example), and generates reports to be transmitted to the AMR system head end via communication interface module 314, and communications circuitry 212. Clock module 316 represents a real-time clock that keeps track of the time and date for accurately recording measurements and for conducting communications and other time-specific or time-synchronized activities. The operation of local endpoint module 302, local sensor interface 206, and endpoint data set 304 is essentially conventional operation of corresponding functionality in traditional 2-way endpoints.

Remote endpoint virtualization module 306 is similar to local endpoint module 302, except that remote endpoint virtualization module 306 is not associated with local sensor 202 and local endpoint ID 303. Instead, remote endpoint virtualization module 306 is associated with one or more remote 1-way endpoints that are clients of the proxy service which virtualizes the 1-way or 1.5-way endpoints into virtual 2-way endpoints. Remote endpoint virtualization module 306 interfaces with the remote 1-way or 1.5-way endpoints that are its proxy clients via remote endpoint interface module 310.

There may be plurality of instances of remote endpoint virtualization module 306, as depicted in FIG. 3. Each instance is associated with its own virtual endpoint ID 307, such as 307a, 307b, and 307c in the example depicted. in one embodiment, each instance of remote endpoint virtualization module 306 is created when a new 1-way endpoint is assigned to be a proxy client to be virtualized. Each instance of remote endpoint virtualization module 306 stores data received from its corresponding 1-way endpoint in a corresponding remote endpoint data set 308, which can be part of data store 210. In one embodiment, remote endpoint virtualization module 306 includes a data reconciliation feature that avoids storing duplicative data. This feature is particularly useful in embodiments where the 1-way endpoints operate in a regime in which they repeatedly send the same data in many consecutive transmissions.

In a related embodiment, each instance of remote endpoint virtualization module 306 can have its own distinct configuration settings. Remote endpoint virtualization module 306 also receives and processes commands and system configuration updates from hierarchically superior devices of the AMR system (such as the system head end and gateway devices, for example), and generates reports to be transmitted to the AMR system head end via communication interface module 314, and communications circuitry 212.

Remote endpoint interface module 310 is configured to monitor the communication band to detect the presence of potential 1-way endpoints that could be supported by the proxy service, participate in the proxy assignment arbitration process in which the subnet determines a most suitable proxy device for each 1-each endpoint, identify received communications from assigned 1-way endpoints and forward those communications to remote endpoint virtualization module 306, and, for 1.5-way endpoint client devices, transmit a suitable wakeup tone to prompt those devices to transmit their data. Remote endpoint interface module 310 maintains a listing 312 of 1-way endpoints, which can include such relevant information as observed bubble-up schedule of the 1-way endpoints, link quality indicators based on past communications with individual 1-way endpoints, wakeup tone parameters for supported 1.5-way endpoints, etc. In addition, listing 312 can include information relating to non-assigned 1-way endpoints from which communications are being received. This information can be used for the proxy assignment arbitration process.

Communication interface module 314 operatively couples each of the local endpoint module, remote endpoint virtualization module, and remote endpoint interface module, with communications circuitry 212. Communication interface module 314 is configured to parse incoming messages, determine the source and destination of the incoming messages, extract the relevant content from the data payload of the packetized messages, and provide the relevant content to the appropriate destination module. An incoming message may be from the system head end, a local master device such as a gateway, other 2-way endpoints, or 1-way endpoints. Certain incoming messages are addressed to the local 2-way endpoint, others may be addressed to a specific virtual 2-way endpoint, still others may be addressed to a distinct two-way endpoint or other AMR system component (e.g., gateway, head end, etc.) and meant to be routed to its final destination. For those messages to be consumed at the 2-way endpoint, some may be instructions requesting the local endpoint or a virtual endpoint to take some action; whereas other messages can contain instructions relating to the proxy operations, such as instructions from a gateway device indicating proxy service assignment. In one embodiment, communication interface module 314 interprets and identifies the various messages received, and takes appropriate action.

Communication interface module 314 also has a role in transmitting outgoing messages. In one example embodiment, communication interface module 314 packages a message to be transmitted, and passes the packaged messages to communications circuitry 212 for transmission. In a related embodiment, communications circuitry 212 includes a plurality of radio circuits, such as AMI system communications circuitry 212a, and auxiliary local area communication circuitry 212b. In this example, AMI system communications circuitry 212a can be regarded as the standard radio communications circuitry of 2-way devices in an AMI mesh network. This circuitry can send and receive messages in the operational RF band, and perform all of the relevant functionality, including such functions as error detection/correction, encryption/decryption, frequency hopping operability, etc. Optionally, the auxiliary local area communications circuitry 212b is dedicated to proxy-related functionality, such as monitoring the RF band for extended periods to detect communications from 1-way devices, receiving communications from the 1-way endpoint, and, for 1.5-way devices, transmitting wakeup tones. Having the auxiliary communications circuitry can free up the main AMI system communications circuitry 212 to handle the usual communications workload of the 2-way endpoint. In this type of embodiment, one role of communication interface module 314 is to pass messages/wakeup tones to be transmitted to the appropriate radio circuitry.

Figure 4:
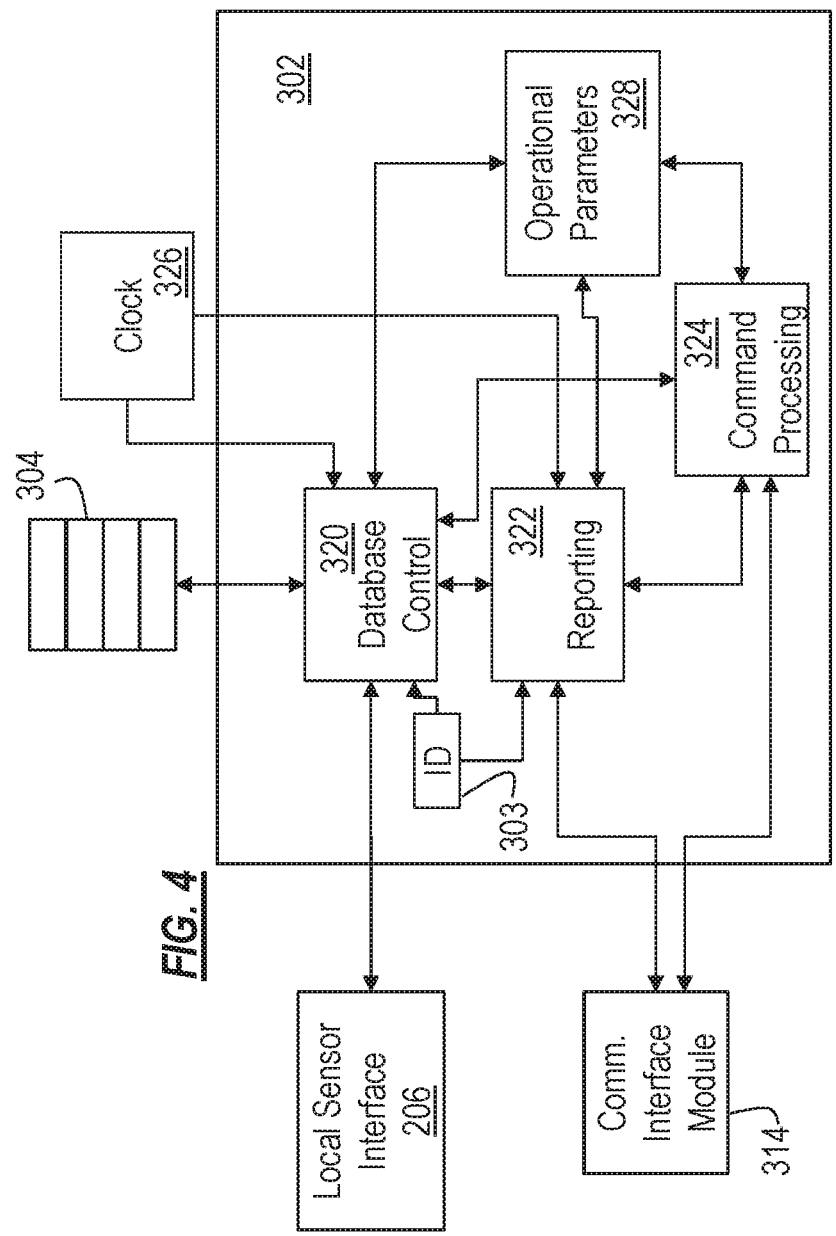
FIG. 4 is a block diagram illustrating some of the functional modules of a local endpoint module that is part of the 2-way endpoint described with reference to FIG. 3 according to one example embodiment.

FIG. 4 is a block diagram illustrating some of the functional modules of local endpoint module 302 according to one example embodiment. Database control module 320 writes newly-collected data to local endpoint data set 304, removes data therefrom, and queries local endpoint data set 304 to gather the necessary data for generating reports to the AMR system head end. Reporting module 322 constructs reports, including simple packets with one or a few readings, or more complex packets with interval data, configuration information, sensor status, etc. Command processing module 324 receives instructions and configuration information from other system devices such as gateway devices or the system head end, and executes those commands or updates. For example, there may be a command to send the current consumption value, or there may be a command requesting the last n intervals, in which case command processing module 324 causes database control module 320 or reporting module 322, or both, to take the necessary actions so that the instruction can be carried out. For example, in the case of an on-demand read command requesting the current consumption value, command processing module 324 coordinates operation of database control module 320 or reporting module 322 to retrieve the most recently-received data corresponding to the 1-way endpoint for which the on-demand read is requesting data, and packages that data into a report to be delivered to the requestor, e.g., head end system. In a related embodiment, instead of sending the most recent previously-received and stored item of sensor data for the 1-way endpoint, the command processing module 324 coordinates operation of database control module 320 or reporting module 322 to generate the report in response to the next available item of sensor data to be received from the 1-way endpoint. This latter option will provide a report with a greater latency due to the time required to wait for, and receive the next sensor data item, but will contain the most up-to-date data possible in terms of the time duration between the data collection and reporting of that data.

Operational parameters module 328 stores the various settings that define the configurable operational characteristics of local endpoint module 302. For example, reporting formats for various types of messages, data storage practices, e.g., data structure formats, retention schedules, etc., interval data definitions, data aggregation formulas, and the like. The operational parameters can be configured remotely via the communication interface module 314 and command processing module 324.

Figure 5:
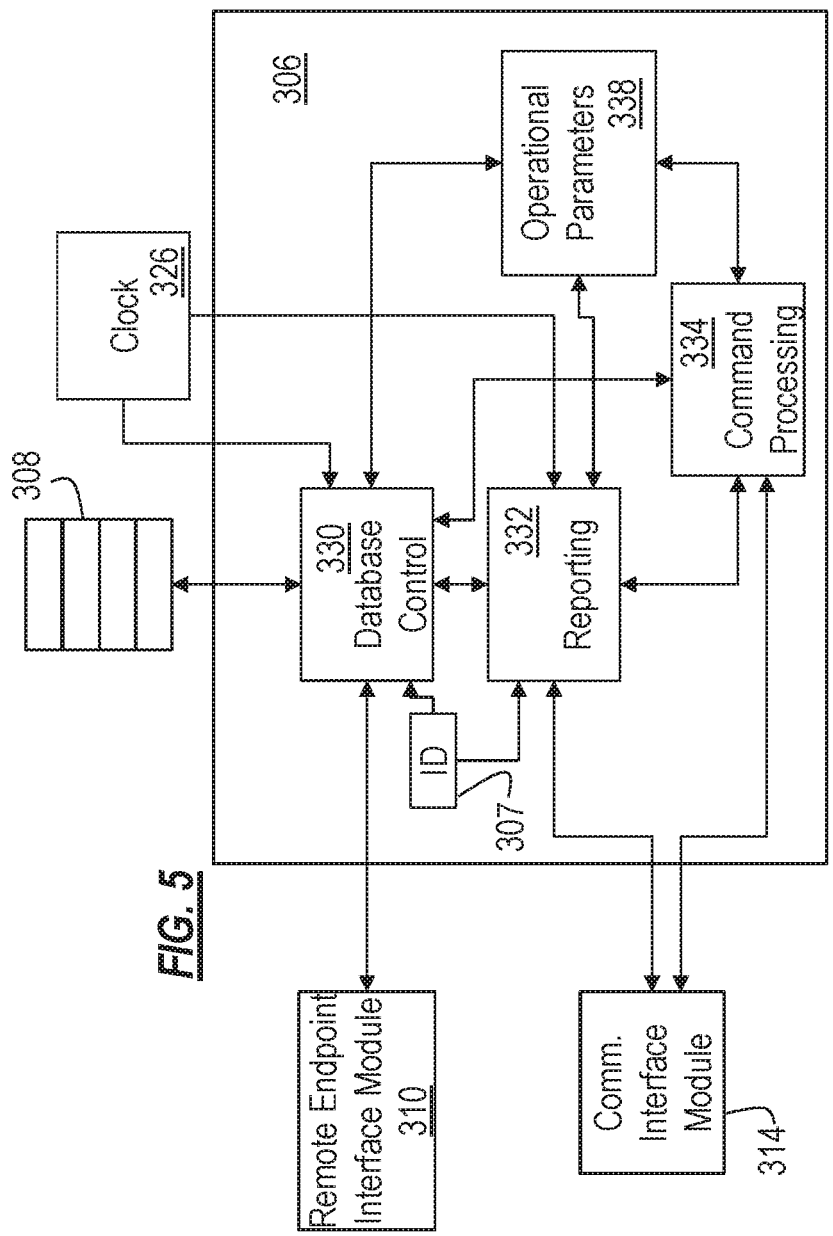
FIG. 5 is a block diagram illustrating some of the functional modules of an instance of a remote endpoint virtualization module according to an example embodiment.

FIG. 5 is a block diagram illustrating some of the functional modules of an instance of remote endpoint virtualization module 306 according to an example embodiment. As stated above, the modules of remote endpoint virtualization module 306 are very similar to those of local endpoint module 302, though there are some differences. For instance, virtual endpoint ID 307 is uniquely associated with a particular 1-way endpoint that is being virtualized as a two-way endpoint. Database control module 330 is similar in functionality to module 320, except that, in one embodiment, module 330 implements a duplicative data reconciliation algorithm that removes redundant data. Reporting module 332 is similar to module 322, except that, as part of creating a virtual 2-way endpoint from an actual 1-way endpoint, certain reporting is prepared with best-available data, or with interpolated data, rather than actual data. For example, in response to a command to return a current consumption value, reporting module 332 selects the most recently-stored data in data set 308 since it may not be possible to obtain an instant reading. In another example, if there is a request for data at different intervals than what is available from the sampling and message transmission rate of a given 1-way endpoint, the requested interval data can be estimated using interpolated data points to fill in missing values or values falling between sampling times.

Command processing module 334 is similar to module 324, except that certain commands may not be available for virtual endpoints, in which cases command processing module 334 either returns a message indicating that an unsupported command cannot be carried out, or performs a related action to provide a similar, if not exact, result, e.g., providing interpolated data in lieu of actual data at unsupported intervals.

Operational parameters module 338 operates essentially like operational parameters module 328 in that it stores settings that define the configurable operational characteristics of remote endpoint virtualization module 306. The operational parameters of remote endpoint virtualization module 306 can differ somewhat from those of local endpoint module 302. For instance, the available ranges for certain operational settings might be relatively more limited, such as the case where more frequent sampling of the sensor than what is available from the 1-way endpoint may not be possible. In a related embodiment, however, data is interpolated or extrapolated from the actual data points in order to emulate an actual 2-way endpoint.

FIG. 6 is a flow diagram illustrating an example of decision logic for handling incoming messages received at a 2-way endpoint that is configured to also perform proxy operations for one or more supported 1-way endpoints. This exemplary decision logic can be implemented in communication interface module 314 according to one embodiment. At 602, an incoming message is received. The incoming message is generally in the form of a packet (or group of packets), with the frame including a header portion that indicates a destination address. At 604, communication interface module 314 reads the destination indicated in the packet. The destination in this example can be one of three types: remote endpoint, local endpoint, and upstream, i.e., towards the central data collection point such as the system head end.

In the case of the message being addressed to a remote endpoint, there is a decision made at block 606 to determine if the message is addressed to a hosted 1-way endpoint for which the two-way endpoint receiving the message is assigned to act as a proxy. In a related embodiment, to make the determination at 606, communication interface module 314 first passes the message to remote endpoint interface module 310, which looks up the destination endpoint in listing 312. If the endpoint is not listed (and, since it has already been determined that the message is not addressed to the local 2-way endpoint) the message is deduced to be for a remote, non-hosted endpoint (which can be a 2-way device or virtual 2-way device). In this case, the message is routed towards its destination at 608, which can be one or multiple hops downstream.

If the message is addressed to a locally-hosted 1-way endpoint, the message is extracted from the packet and passed to the appropriate remote endpoint virtualization module 306. This happens internally to the 2-way endpoint (i.e., Messages addressed to the local endpoint are parsed to have the message contents extracted, then forwarded to the local endpoint module 302. Messages addressed to the head end, gateway device, or otherwise upstream, are simply routed appropriately to their next hop.

Figure 7B:
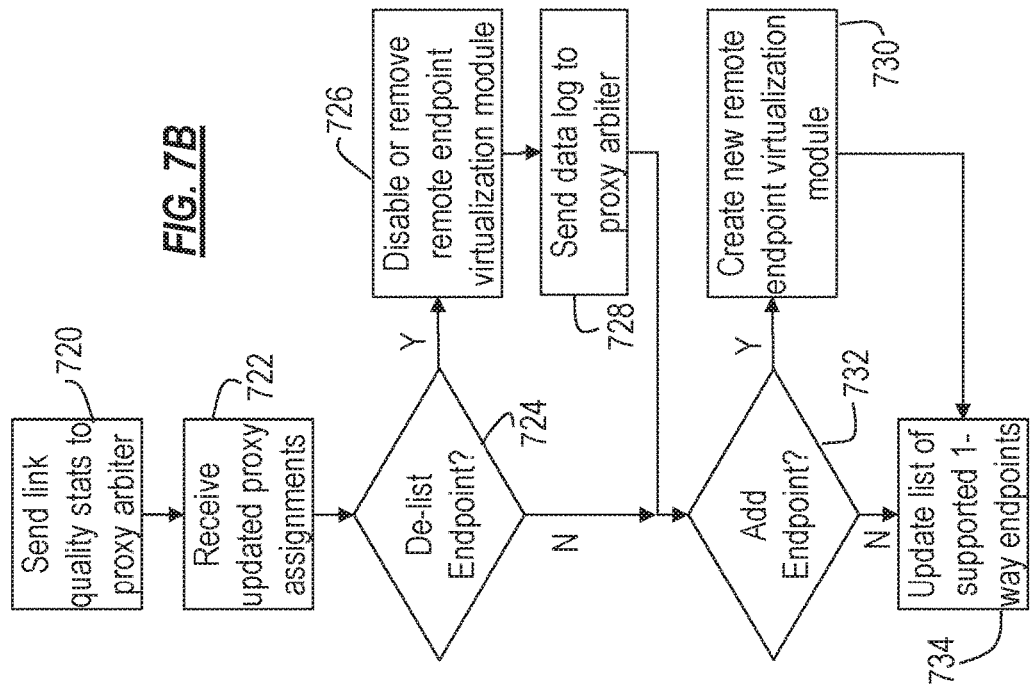
FIG. 7B is an example process carried out by 2-way endpoints that have been assigned to act as proxies, or those which are potential proxy devices, for participating in proxy assignment arbitration according to one embodiment.
Figure 7A:
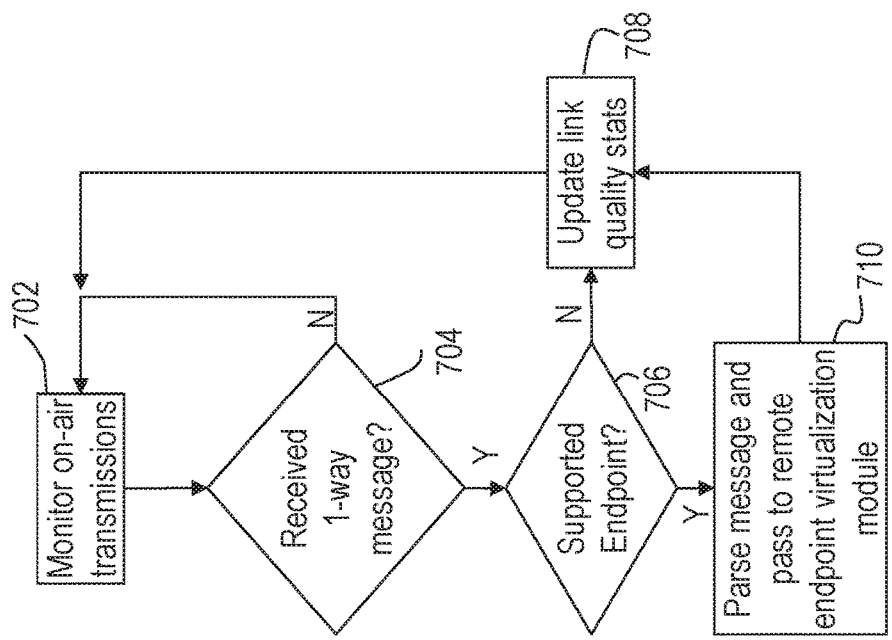
FIG. 7A represents a process of handling communications received from 1-way endpoints according to one embodiment.

FIGS. 7A and 7B are flow diagrams illustrating some of the operations performed by remote endpoint interface module 310 according to example embodiments. FIG. 7A represents a process of handling communications received from 1-way endpoints. At 702 the communication band is monitored for transmissions, including those from 1-way endpoints. In one type of embodiment where the 1-way devices communicate in the same radio band as the 2-way network, 1-way transmissions are detected and received as part of the 2-way endpoint devices' general monitoring of the communication channel for transmissions from any type of device. In another type of embodiment, where the 1-way devices do not communicate in the radio band used by the 2-way system, the potential 2-way proxy devices periodically monitor the 1-way communications band. This periodic monitoring could be performed concurrently with, or in interspersed fashion, with the general monitoring of the 2-way network communications. This monitoring can be performed by the AMR system communications circuit 212a, or by an auxiliary local area communications circuit 212b, if available. Monitoring involves listening for the presence of transmissions having supported formats. This monitoring operation can be distinct from the usual operation of 2-way endpoints in mesh networks that constantly monitor the communications band for transmissions to be routed. In this approach, a number of different formats can be supported for various 1-way endpoints from various manufacturers, in addition to supporting the usual mesh network communications format. Even certain transmissions from 1.5-way endpoints can be listened to in this manner (such as the case where a 1.5-way endpoint transmits an alarm—which may occur without being prompted by a wakeup tone).

At 704 it is determined whether a received communication is from a 1-way endpoint. In this case, at 706, the received message is parsed to determine its source, and a determination is made if the transmitting endpoint is one of the supported 1-way endpoints to which the proxy support is assigned. If it is a non-supported endpoint, the transmission is nonetheless logged so that the system can be aware of the existence of the link, along with updating a quality measure of the link. Listing 312 can be used as a database in which to store the logged link quality information. The quality measure can include such measures as number of messages received (error-free) within some set period of time, such as per hour, per day, etc, which may reflect the receiver's average busy status and hence potential preference as a proxy. Other link quality indicators can be used as well, such as signal strength, and the like, although such measures by themselves are not always the best indicator of link reliability. If the message is received from a supported 1-way endpoint, at 710 the message is processed to extract the message contents, and those are passed to the remote endpoint virtualization module 306 that corresponds to the particular 1-way endpoint. The process proceeds to block 708 to update the link quality statistics for the supported endpoint.

FIG. 7B is an example process carried out by 2-way endpoints that have been assigned to act as proxies, or those which are potential proxy devices, for participating in proxy assignment arbitration. As described above, according to one type of embodiment, the arbiter is a local master device such as a gateway device which is a collection point for information from many 2-way devices and, as such, has higher-level visibility of the local network segment and the 1-way devices therein. Though the decision is ultimately made by the arbiter, the information upon which the decision is made is provided from a distributed set of 2-way endpoints that are actual, or potential, proxy devices. Accordingly, each of these 2-way endpoints periodically (or in response to prompting from the arbiter device) sends its link quality statistics to the arbiter at 720. The link quality statistics can be a portion of listing 312, or can be a set of data compiled based on information stored in listing 312, for example.

The proxy assignment arbiter, having collected link quality information (along with other relevant information such as resource burden, communication latency, and the like, which can be used for scoring each potential proxy device) applies its decision logic to select one (or more) 2-way endpoints to act as proxies supporting each 1-way endpoint. Each 2-way proxy device can be assigned more than one 1-way endpoint to support. Accordingly, at 722, the 2-way endpoint receives updated proxy assignments (this information can simply be a re-affirmation of the existing assignments, as will be the case most often). Next, the 2-way endpoint updates its configuration, as needed. At 724 a determination is made based on the updated assignment instructions whether any 1-way endpoints are to be de-listed (i.e., no longer supported). If this is the case, the remote endpoint virtualization module 726 can be disabled or removed to preserve available computing and storage resources. In various embodiments, historic data from a de-listed 1-way endpoint are kept for some retention period, before being deleted. At 728, the data log is transferred to the arbiter device as depicted in FIG. 7B; whereas in a related embodiment, the data log may be transferred directly to a newly-assigned proxy device per special instruction from the arbiter. At 732, it is determined if a new 1-way endpoint is being assigned in the updated proxy assignment received at 722. In this case, a new instance of remote endpoint virtualization module 306 is created for that 1-way endpoint at 730. At 734, the local list of supported 1-way endpoints is updated, and stored in listing 312. The 2-way endpoint also performs any necessary network routing update functions to establish itself as the next hop routing for connectivity to assigned 1-way endpoint. Where necessary, this ensures network routing connectivity from the head end system to the 1-way endpoint.

Remote endpoint interface module 310 uses communication circuitry 212 to monitor the multiplicity of channels utilized by the frequency-hopping spread spectrum radio system to detect periodic transmissions from 1-way endpoints. The most robust form of monitoring is operating a dedicated receiver capable of continuously monitoring the communications band. The auxiliary local area communication circuitry 212b can perform much of this functionality, though it may have difficulty receiving multiple simultaneous transmissions, or transmitting an outgoing message while receiving an incoming message, depending on the quality of the radio circuitry. Still, much of the communications band can be listened to for a vast majority of the time. For devices lacking the auxiliary local communications circuitry 212b, however, the regular AMI system communications circuitry 212a has many more roles, including receiving and forwarding packets being routed through the AMI mesh network, sending and receiving 2-way communications for the local 2-way endpoint, sending and receiving communications for virtual 2-way endpoints being hosted on the device, etc. Therefore, there is significantly less continuous time available for monitoring the airwaves for 1-way transmissions which given its own network communications would reduce the potential for reliable detection and reception of messages from neighboring 1-way endpoints.

Figure 8:
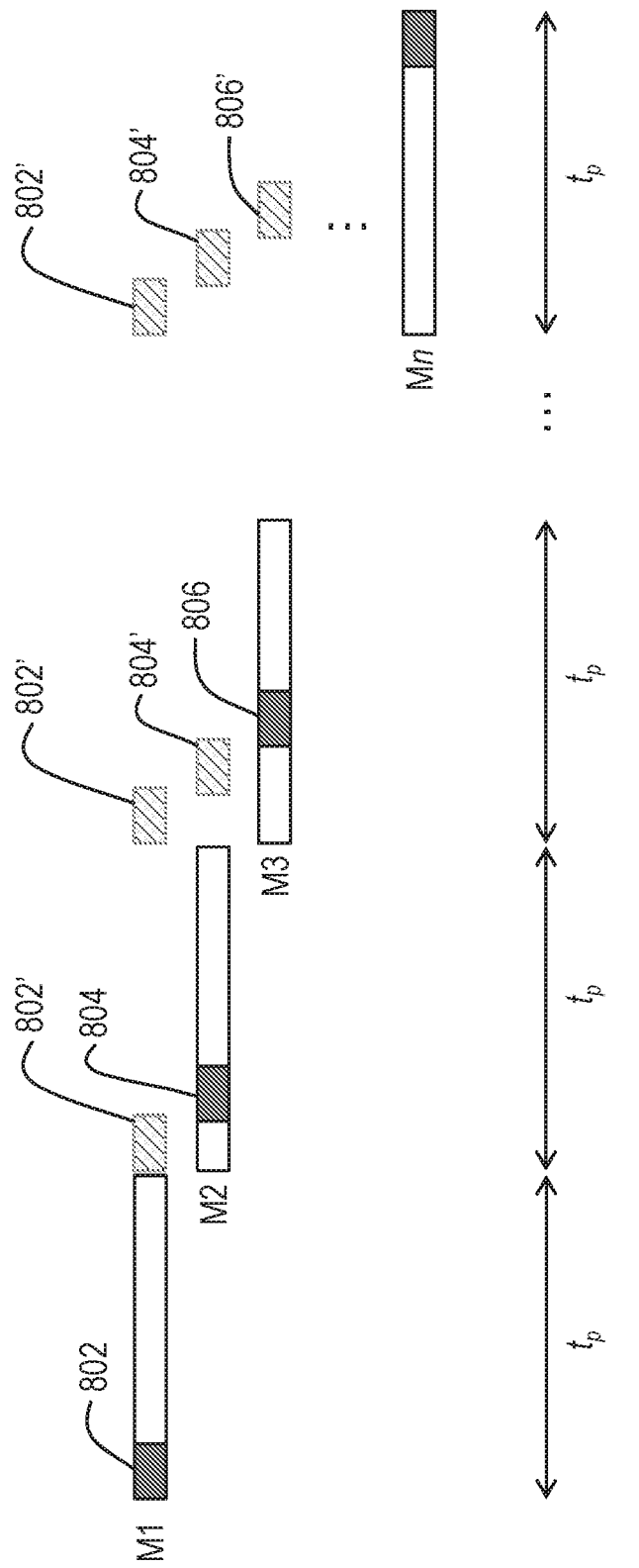
FIG. 8 is a timing diagram illustrating an exemplary process of intermittently monitoring the communications band to discover 1-way endpoints according to one embodiment.

This problem is addressed in a related aspect of the invention whereby the communications band is monitored intermittently, but in an organized fashion to increase the likelihood that the 1-way endpoints are heard. FIG. 8 is a timing diagram illustrating an exemplary process of intermittently monitoring the communications band to discover 1-way endpoints according to one embodiment, which can be performed by prospective proxy devices. The principle of this approach is to ensure that the full communication cycle of known types of 1-way endpoints is covered. Accordingly, as illustrated, a supported type of 1-way endpoint is known to be configured with a communication cycle having a period $t_p$. In this period, most of the time the 1-way endpoint is in its standby mode and silent; however, for a brief time duration, the endpoint wakes up from its standby mode and transmits its data. Since the proxy device is only able to listen for brief time periods, the listening periods are staged in such a way that the entire communication cycle period tp is eventually listened to over the duration of n cycle periods. As depicted, monitoring period M1 is monitored for the duration 802 within the cycle period tp; In a subsequent monitoring cycle, monitoring window M2 is monitored for the duration 804 within the cycle period tp, subsequently, monitoring period is monitored for the duration 806 within the cycle period tp, and so on. Each duration of monitoring 802, 804, 806 is aligned relative to a common point of the 1-way endpoint's communication cycle such that, after n monitoring periods M1-Mn, the entire communication cycle tp is monitored. Durations 802, 804. and 806 are shown relative to subsequent monitoring periods, as indicated with reference numerals 802', 804', and 806', respectively. As depicted, monitoring durations 802, 804, 8706, etc., overlap with one another to account for variability in the timekeeping among endpoints.

This monitoring is continued on a single frequency channel for the time duration taken by 1-way endpoints to hop across all of their assigned hopping frequencies. At the end of such a duration the proxy device moves to a second frequency and repeats the monitoring process again for a duration long enough for 1-way devices to hop across all assigned frequencies. By the time the proxy has covered all of the 1-way device hopping frequencies it will have been able to detect the presence of all 1-way devices within radio range irrespective of their individual hopping patterns. From the detection of the presence of individual devices, the proxy can then target the particular 1-way endpoints based on their particular hopping patterns without the need for the more extensive full frequency scans. The proxy device will however still maintain a cycle of performing the full frequency searching scans to be able to detect the presence of newly introduced 1-way endpoints.

This process can be adjusted if there are various other 1-way endpoints that are known to have different communication cycle periods. For example one type of 1-way endpoint might bubble up every 10 seconds; whereas another type might be configured to bubble up every 30 seconds. Accordingly, over, time, the entire communication band can be monitored. Once 1-way endpoints are discovered, the monitoring process can be adjusted specifically to focus on each known 1-way endpoint according to its known communication behavior so that the receiver can be activated during a time window in which a next periodic transmission from that endpoint is expected. This latter operating mode can be utilized preferentially over the scanning mode since the addition of new 1-way endpoints in an established neighborhood is relatively infrequent, whereas receiving existing, known, 1-way endpoint signals is a priority.

Aspects of the invention provide an autonomous, self-configuring approach to supporting 1-way endpoints using a 2-way system such as an AMI system, without requiring specific provisioning at the system head end to incorporate the more limited data provided from these 1-way devices. Instead, with the virtualized 2-way endpoints, the system head end can conduct specific on-demand reads, system-wide on-demand reads, request specific and varying interval data, etc., from any endpoint. Aspects of the invention beneficially provide an arrangement whereby, with a simple firmware upgrade to existing 2-way devices, the devices will work with other system components to automatically self-organize to efficiently find and establish the proxy services for, 1-way endpoints.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. For example, the 2-way endpoint configured to operate as a proxy device for 1-way endpoints need not actually be operated as a local 2-way endpoint with a local sensor. Indeed, there may be applications where a 2-way endpoint is installed primarily for the purpose of serving as a proxy for 1-way endpoints. This can be efficiently accomplished without having to design, build, and manage inventory of specialized hardware by simply utilizing 2-way endpoints such as those described above, without making use of the local sensor interface and local endpoint module. These components may be disabled in the firmware configuration, or may be fully-functional but simply unused. The proxy device of this embodiment utilizes its own local endpoint ID so that it may be configured remotely, and may participate in routing packets in the 2-way multihop network.

The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A system for two-way automatic sensor data collection, the system comprising:
    at least one one-way automatic sensor, each one-way automatic sensor coupled to a corresponding one-way endpoint;
    at least one two-way automatic sensor, each two-way sensor coupled to a corresponding two-way endpoint;
    an endpoint proxy device configured to receive data from the at least one one-way automatic sensor and the at least one two-way automatic sensor, the endpoint proxy device including hardware circuitry configured to implement:
        a remote endpoint interface module configured to wirelessly receive, via the hardware circuitry, one-way transmissions originated from each of the at least one one-way endpoints, the one-way transmissions including sensor data from the at least one sensor transmitted in via a one-way communications protocol; and
        a remote endpoint virtualization module operatively coupled with the remote endpoint interface module and configured to store sensor data received in the one-way transmissions for a first assigned one-way endpoint of the at least one one-way endpoints, and transmit a sensor data report based on the sensor data for the first assigned one-way endpoint, wherein the sensor data report is transmitted via a two-way communications protocol.

2. The system of claim 1, wherein the hardware circuitry of the endpoint device further comprises:
    a processor circuit, a data store operatively coupled to the processor circuit, and communications circuitry operatively coupled to the processor circuit and configured to transmit and receive data communications in a wireless network;
    a local sensor interface operatively coupled to a processor circuit and configured to supply sensor readings from a local sensor to the processor circuit; and
    a local endpoint module associated with a first endpoint ID and configured to obtain first sensor data representing the sensor readings from the local sensor via the local sensor interface, store the first sensor data in the data store, generate reports based on the sensor data for transmission via the communications circuitry, and execute commands received via the communications circuitry.

3. The system of claim 2, wherein at least one one of the one-way endpoints is a 1.5-way endpoint that transmits data in response to a wakeup tone, and wherein the remote endpoint interface module is configured to issue the wakeup tone to be transmitted via the communications circuitry.

4. The system of claim 1, wherein the sensor data report is transmitted in the two-way communications protocol in response to a command requesting the sensor data report.

5. The system of claim 2, wherein the wireless network is a multihop network.

6. The system of claim 1, wherein the system is an automatic meter reading (AMR) system and wherein the at least one one-way automatic sensor and the at least one two-way automatic sensor are each utility meters.

7. The system of claim 1, wherein the system is an advanced metering infrastructure (AMI) system and wherein the at least one one-way endpoint is not an AMI device.

8. A method for operating a system of wirelessly-connected nodes, the method comprising:
    providing at least one one-way automatic sensor, each one-way automatic sensor coupled to a corresponding one-way endpoint;
    providing at least one two-way automatic sensor, each two-way sensor coupled to a corresponding two-way endpoint;
    receiving data from the at least one one-way automatic sensor and the at least one two-way automatic sensor at an endpoint proxy device, the endpoint proxy device including hardware circuitry that implements a remote endpoint interface module configured to wirelessly receive, via the hardware circuitry, one-way transmissions originated from each of the at least one one-way endpoints, the one-way transmissions including sensor data from the at least one sensor transmitted in a one-way communications protocol;
    associating each one-way endpoint of the at least one one-way endpoints with a corresponding virtual endpoint ID by the endpoint proxy device using a remote endpoint virtualization module implemented in the hardware circuitry of the endpoint proxy device,
    storing, via the hardware circuitry of the endpoint proxy device, sensor data received in the one-way transmissions for a first assigned one-way endpoint of the at least one one-way endpoint,
    transmitting, via the hardware circuitry of the endpoint proxy device and a wireless network, a sensor data report based on the sensor data for the first assigned one-way endpoint, wherein the sensor data report is transmitted via a two-way communications protocol; and
    executing, via the hardware circuitry of the endpoint proxy device, a first command on behalf of a one-way endpoint associated with a first virtual endpoint ID in response to receiving a first command from the first virtual endpoint ID.

9. The method of claim 8, wherein the first command addressed to the first virtual endpoint ID includes an instruction to transmit a sensor data report, the method further comprising:
    storing past sensor data by the remote endpoint virtualization module, and
    generating a report based on past sensor data received in the one-way transmissions for the one-way endpoint that is associated with the first virtual endpoint ID.

10. The system of claim 8, wherein the first command addressed to the first virtual endpoint ID includes an instruction to transmit a sensor data report; and the method further comprising:
    in response to the first command and a subsequent reception of sensor data in the one-way transmissions for the one-way endpoint that is associated with the first virtual endpoint ID, generating a report at the remote endpoint virtualization module
    wherein the remote endpoint virtualization module is adapted such that, in response to the first command, the remote endpoint virtualization module generates a report in response to a next subsequent reception of sensor data in the 1-way transmissions for a one-way endpoint that is associated with the first virtual endpoint ID.

11. The method of claim 8, wherein the first command addressed to the first virtual endpoint ID includes an instruction to update configuration settings, and the method further comprises, in response to the first command, updating the operational parameters corresponding to operation of a first virtual endpoint associated with the first virtual endpoint ID.

12. The method of claim 8, wherein the one-way transmissions from the at least one one-way endpoint represent sampling of the sensor data from the at least one sensor at a first sampling rate, the method further comprising:
   in response to the first command, generating a report based on interpolated data computed from sensor data received in the one-way transmissions and a one-way endpoint that is associated with the first virtual endpoint ID.

13. The method of claim 8, further comprising maintaining a listing that identifies each of the at least one remotely-located one-way endpoint, wherein the listing of the at least one remotely-located one-way endpoint includes an indicator of a link quality for each of the at least one remotely-located one-way endpoint.

14. The method of claim 13, wherein the indicator of the link quality includes a measure of successful communications in a predefined time interval.

15. The method of claim 13, wherein the remote endpoint interface module is further adapted to send the listing to a remote proxy assignment arbiter device; and
   wherein the remote endpoint interface module is adapted to receive one-way endpoint assignments determined by the remote proxy assignment arbiter device, the one-way endpoint assignments indicating one-way endpoints for which sensor data is to be stored by the remote endpoint virtualization module.

16. The method of claim 15, wherein the remote proxy assignment arbiter device is a gateway device.

\* \* \* \* \*